March 1, 1932.  F. P. FRANKFORD  1,847,338
AIR BRAKE AND VEHICLE CONTROL
Filed July 18, 1930
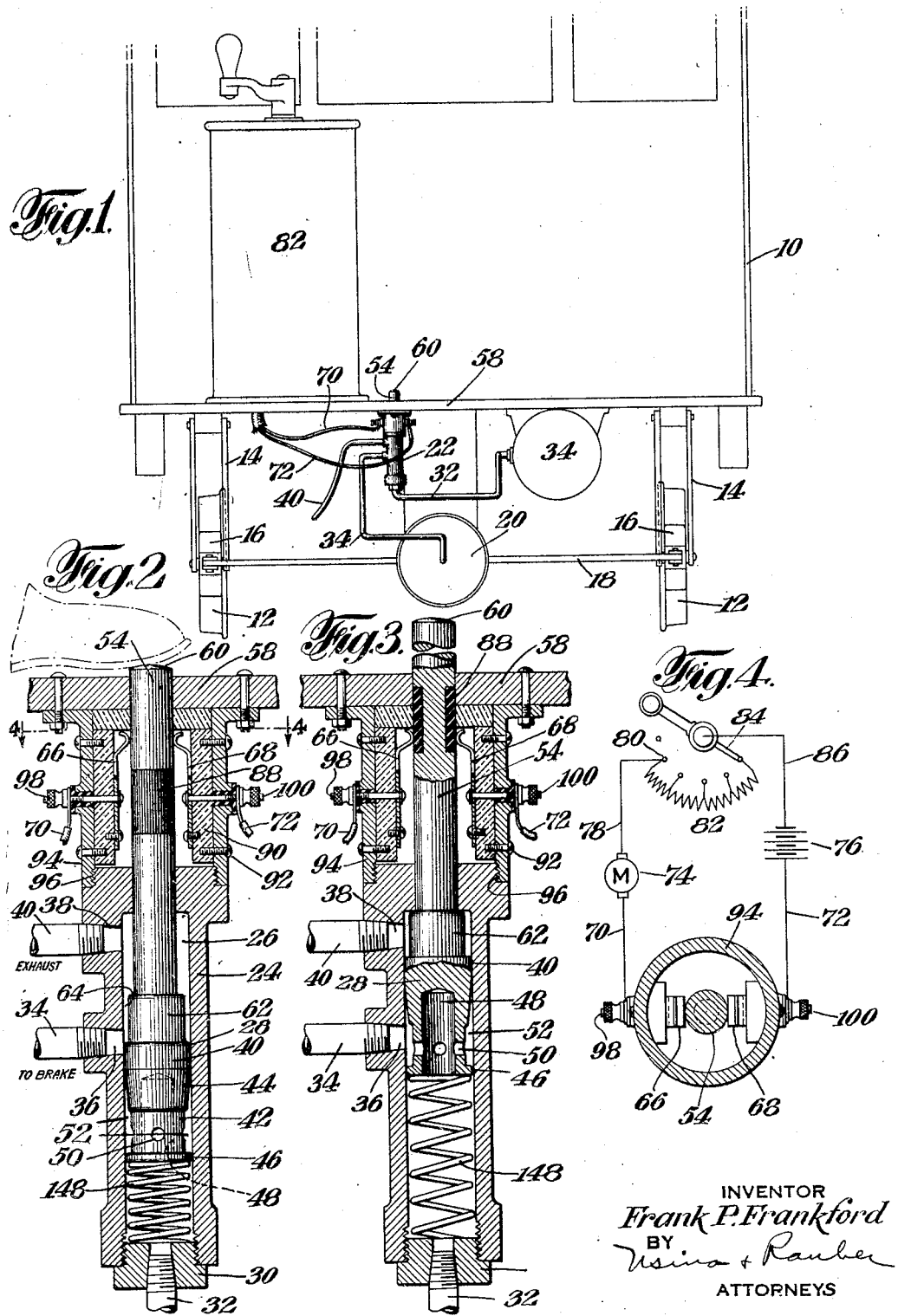
INVENTOR
Frank P. Frankford
BY
ATTORNEYS Patented Mar. 1, 1932

1,847,338

UNITED STATES PATENT OFFICE

FRANK P. FRANKFORD, OF RIDGEFIELD PARK, NEW JERSEY

AIR BRAKE AND VEHICLE CONTROL

Application filed July 18, 1930. Serial No. 468,860.

This invention aims to provide control means for vehicles such as street cars, motor vehicles and the like. One feature of invention relates to the provision of an air brake control valve having a circuit control device combined therewith which is adapted to interrupt transmission of power to the vehicle simultaneously with the application of the air brakes.

The invention will be fully apparent from the following specification when read in connection with the accompanying drawings and will be defined with particularity in the appended claims.

In the drawings:—

Fig. 1 is a vertical section illustrating certain parts of a street car showing one embodiment of my invention applied thereto;

Fig. 2 is an enlarged longitudinal vertical section through an air brake control valve and circuit control device. The parts being shown in the position they occupy when the vehicle is in motion;

Fig. 3 is a view similar to Fig. 2 illustrating the position of the parts when the brakes are applied to stop the vehicle and interrupt the supply of power thereto;

Fig. 4 is a section on line 4—4 of Fig. 2 with the addition of a diagram illustrating the vehicle motor control circuit;

Referring first to Figs. 1 to 4 inclusive, 10 represents a street car supported on wheels 12 in a manner well known.

Brake hangers 14 support brake shoes 16 which are adapted to be pressed against the peripheries of the wheels 12 by a brake beam 18 by means of a piston, operating in a brake cylinder 20 when air is admitted thereto. The supply of air to the brake cylinder 20 is controlled by a valve indicated as a whole at 22. This valve comprises a casing 24 having a longitudinally extending chamber 26 therein within which a valve plunger indicated as a whole at 28 operates. The lower end of chamber 26 is closed by a plug 30. Air is supplied to the valve chamber through pipe 32 which communicates with an air reservoir 34 which may be charged by a suitable motor driven compresser.

Brake cylinder 20 is connected by means of a pipe 34 and valve port 36 with the valve chamber 26. Spaced from the port 36 there is an exhaust port 38 having an exhaust pipe 40 connected therewith.

The plunger 28 includes a cylindrical portion 40 which is of substantially the same diameter as the chamber 26 so as to be freely slidable therein and yet not prevent the escape of any appreciable amount of air pressure. The cylindrical portion is joined to a neck portion 42 of reduced diameter by means of a graduating portion 44, whose diameter increases gradually from the neck portion to the cylindrical portion. At the lower extremity of the plunger, there is a ring portion 46 of substantially the same diameter as the chamber 26.

A cavity 48 extends a short distance longitudinally of the plunger and this cavity communicates by means of ports 50 with the annular space 52 surrounding the neck portion and graduating portion of the plunger.

The plunger includes an operating stem 54 which extends through the flooring 58 of the vehicle. Normally the operator holds his foot against the upper end 60 of the stem 54 so as to prevent passage of air from the reservoir 34 to the port 36 communicating with the brake pipe 34. Thus, when the parts are in the running position of Fig. 2, there will be no supply of air to the brake cylinder. In this position, a reduced portion 62 of the plunger will be opposite the brake pipe port 36. Thus air from the brake cylinder can be exhausted through pipe 34 into the space 64 between the portion 62 of the plunger and the wall of chamber 26 to the exhaust pipe 40 through port 38.

To apply the brakes, the operator gradually lifts his foot. This permits the air pressure to force the plunger upwardly toward the position illustrated in Fig. 3. During this movement, the gradually increasing parts of the graduating portion 44 of the plunger pass the port 36 and thereby permit a gradual application of the brakes, the air flowing from the reservoir 34 through pipe 32, through cavity 48 and ports 50, to the port 36 and pipe 34 to the brake cylinder.

For an emergency application of the brakes, the operator quickly lifts his foot. This permits the air pressure to immediately froce the plunger to the position of Fig. 3 so that the reduced neck portion 42 comes opposite the port 36 hence the inrush of fluid pressure gives an emergency application of the brakes. When the plunger is in brake application position, the cylindrical portion 40 of the plunger cuts off communication between the brake pipe supply port 36 and the exhaust port 38.

Whenever the brakes are applied, it is advantageous to simultaneously interrupt the supply of power to the vehicle driven mechanism. To this end, I provide a pair of circuit contact fingers 66 and 68 which are connected by means of wires 70 and 72 with a vehicle driving motor 74 and a suitable source of electric current 76. The motor 74 is connected by wire 78 with a contact 80 of a suitable controller indicated diagrammatically at 82. The movable switch member 84 of this controller is connected by wire 86 with the current supply. As thus arranged, it will be understood that when the fingers 66 and 68 engage the metallic stem 54 of the plunger, the circuit will be closed through the controller the source of current 76 and the motor 74, thus permitting the motor to operate. When the brakes are applied and the plunger is lifted to the position of Fig. 2, an insulated sleeve 88 surrounding a portion of the stem 54 comes into engagement with the contact fingers and thereby breaks the circuit, thus interrupting the flow of current to the drive motor.

The contact fingers are supported on insulators 90 which are secured by suitable screws 92 to a sleeve-like fitting 94 which is detachably secured to the threaded shank 96 formed on the upper end of valve casing 24. The wires 70 and 72 are electrically connected to the contact fingers 66 and 68 by means of binding posts 98 and 100 which extend through suitable insulated bushings fitted within apertures formed in the sleeve-like fitting 94.

While it is not essential to the operation of the device, I provide a light spring 148 between the lower end of the valve plunger and the plug 30. This serves as a yielding stop for the downward movement of the plunger, the spring being adapted to go practically solid upon the limit of downward movement of the plunger.

While I have described with great particularity the specific embodiments of the invention herein illustrated it is not to be construed that I am limited thereto since changes in arrangement and substitution of equivalents may be made by those skilled in the art without departing from the invention as defined in the appended claims.

What I claim is:

1. An air brake control valve of the class described including a chambered valve casing having ports formed therein, a plunger, a stem secured to the plunger, insulated portions secured to said stem, and contact fingers positioned for engagement with said stem and said insulated portion.

2. A device of the character described comprising a chambered casing having ports therein, a metallic plunger controlling the passage of fluid through said ports, contact fingers arranged for engagement with a portion of said plunger, a fitting secured to the casing for supporting said contact fingers and means for insulating the latter from said fitting.

3. A device of the character described comprising a chambered casing having ports therein, a metallic plunger controlling the passage of fluid through said ports, contact fingers arranged for engagement with a portion of said plunger, a fitting detachably secured to said casing, insulators secured to the fitting, means for securing the contact fingers to said insulators.

4. In an apparatus of the character described, a valve casing having a chamber extending longitudinally thereof, a valve plunger movable axially of said chamber, a duct adapted to communicate with a source of fluid pressure and with one end of said chamber so that the pressure will tend to force said plunger toward the opposite end thereof, respective ports in said chamber adapted to communicate with atmosphere and a brake cylinder, said plunger having one portion substantially the same diameter as said chamber and other portions of smaller diameter adapted to be brought into juxtaposition to said ports to permit passage of fluid through them, one of the portions of smaller diameter being in communication with the end of the chamber which is adapted to communicate with said source of fluid pressure.

5. In an apparatus of the class described, a valve casing having a chamber extending longitudinally thereof, a valve plunger movable axially of said chamber, a duct adapted to communicate with the source of fluid pressure and with one end of said chamber so that the pressure tends to force said plunger toward the opposite end thereof, respective ports in said chamber adapted to communicate with atmosphere and a brake cylinder, said plunger having one portion substantially the same diameter as said chamber and other portions of smaller diameter adapted to be brought into juxtaposition to said ports to permit passage of fluid through them, a manually operable stem secured to said plunger and extending through an opening in the casing.

6. An air brake control valve of the class described comprising a valve casing having a substantially cylindrical chamber therein, spaced ports opening into the chamber, a plunger movable axially of the chamber, and having a substantially cylindrical portion which makes a sliding engagement with the wall of the chamber and a neck portion of reduced diameter connected with the cylindrical portion by a graduating portion whose diameter increases gradually from that of the neck portion to that of the cylindrcal portion, the space surrounding said neck portion communicating with one end of said chamber.

In witness whereof, I have hereunto signed my name.

FRANK P. FRANKFORD.